(12) United States Patent
Joseph

(10) Patent No.: US 11,879,762 B2
(45) Date of Patent: Jan. 23, 2024

(54) PORTABLE GROUT DEVICE

(71) Applicant: JP Joseph LLC, Grand Blanc, MI (US)

(72) Inventor: James P. Joseph, Grand Blanc, MI (US)

(73) Assignee: JP Joseph LLC, Grand Blanc, MI (US)

( * ) Notice: Subject to any disclaimer, the term of this patent is extended or adjusted under 35 U.S.C. 154(b) by 0 days.

(21) Appl. No.: 17/220,148

(22) Filed: Apr. 1, 2021

(65) Prior Publication Data

US 2022/0316931 A1  Oct. 6, 2022

(51) Int. Cl.
| | | |
|---|---|---|
| *G01F 13/00* | (2006.01) | |
| *E04G 21/04* | (2006.01) | |
| *E04B 2/24* | (2006.01) | |

(52) U.S. Cl.
CPC ........... *G01F 13/005* (2013.01); *E04G 21/04* (2013.01); *E04B 2/24* (2013.01)

(58) Field of Classification Search
CPC .......... G01F 13/005; E04G 21/04; E04B 2/24
USPC ............................ 222/71, 232, 240, 342, 200
See application file for complete search history.

(56) References Cited

U.S. PATENT DOCUMENTS

| | | | | |
|---|---|---|---|---|
| 2,908,425 A | * | 10/1959 | Denson ............. | B05C 17/00569 222/262 |
| 3,868,046 A | * | 2/1975 | Maddalena ............. | B29C 48/02 222/146.5 |
| 5,054,658 A | * | 10/1991 | Aronie .................... | E04F 21/10 222/232 |
| 5,244,123 A | * | 9/1993 | Benedict ........... | B05C 17/00569 222/231 |
| 5,603,435 A | | 2/1997 | Fenwick | |
| 2006/0175358 A1 | * | 8/2006 | Hall ........................ | E04F 21/12 222/394 |

FOREIGN PATENT DOCUMENTS

| | | |
|---|---|---|
| DE | 102017106002 A1 | 9/2018 |
| EP | 1340553 A2 | 9/2003 |
| EP | 1795271 B1 | 12/2008 |

\* cited by examiner

*Primary Examiner* — Ishal Pancholi
*Assistant Examiner* — Robert K Nichols, II
(74) *Attorney, Agent, or Firm* — Howard & Howard Attorneys PLLC

(57) ABSTRACT

A portable grout device is provided. The device includes a grout hopper, a cylindrical tube portion connected to and operable to receive grout from the grout hopper, and a drive shaft and auger assembly within the cylindrical tube portion. The drive shaft and auger assembly includes a central shaft and a helical auger screw operable to push the grout out of an end of the cylindrical tube portion.

10 Claims, 4 Drawing Sheets

PORTABLE GROUT DEVICE

INTRODUCTION

The disclosure generally relates to a portable grout device useful to provide a flow of grout to a work surface.

SUMMARY

A portable grout device is provided. The device includes a grout hopper, a cylindrical tube portion connected to and operable to receive grout from the grout hopper, and a drive shaft and auger assembly within the cylindrical tube portion. The drive shaft and auger assembly includes a central shaft and a helical auger screw operable to push the grout out of an end of the cylindrical tube portion.

In some embodiments, the end of the cylindrical tube portion includes a first end of the cylindrical tube portion. The drive shaft and auger assembly further includes a drive shaft shank extending from a second end of the cylindrical tube portion, wherein the drive shaft shank is operable to be driven by a handheld torque generating device.

In some embodiments, the drive shaft and auger assembly further includes a disk-shaped thrust washer formed upon the central shaft. The device further includes a removeable end cap fastened upon the second end of the cylindrical tube portion. The removeable end cap includes a central aperture through which the drive shaft shank extends therethrough. The disk-shaped thrust washer is disposed within the cylindrical tube portion and is held within the cylindrical tube portion during operation of the portable grout device by the removeable end cap.

In some embodiments, an adaptor disposed upon the first end is operable to redirect the grout.

In some embodiments, the grout hopper includes a handle.

According to one alternative embodiment, a portable grout system is disclosed. The system includes a portable grout device. The portable grout device includes a grout hopper, a cylindrical tube portion connected to and operable to receive grout from the grout hopper, and a drive shaft and auger assembly within the cylindrical tube portion. The drive shaft and auger assembly includes a central shaft and a helical auger screw operable to push the grout out of an end of the cylindrical tube portion. The system further includes a portable torque generating device connected to the drive shaft and auger assembly.

In some embodiments, the portable torque generating device includes a cordless drill device.

In some embodiments, the end of the cylindrical tube portion includes a first end of the cylindrical tube portion. The drive shaft and auger assembly includes a drive shaft shank extending from a second end of the cylindrical tube portion. The drive shaft shank is operable to be driven by the portable torque generating device.

In some embodiments, the drive shaft and auger assembly further includes a disk-shaped thrust washer formed upon the central shaft. The portable grout device further includes a removeable end cap fastened upon the second end of the cylindrical tube portion, wherein the removeable end cap includes a central aperture through which the drive shaft shank extends therethrough. The disk-shaped thrust washer is disposed within the cylindrical tube portion and is held within the cylindrical tube portion during operation of the portable grout device by the removeable end cap.

In some embodiments, the system further includes an adaptor disposed upon the first end is operable to redirect the grout.

In some embodiments, the grout hopper includes a handle.

According to one alternative embodiment, a portable grout device is provided. The portable grout device includes a grout hopper including a handle portion and a cylindrical tube portion connected to and operable to receive grout from the grout hopper and including a first end and a second end. The device further includes a drive shaft and auger assembly within the cylindrical tube portion. The drive shaft and auger assembly includes a central shaft and a helical auger screw operable to push the grout out of the first end of the cylindrical tube portion. The drive shaft and auger assembly further includes a drive shaft shank extending from a second end of the cylindrical tube portion. The drive shaft shank is operable to be driven by a handheld torque generating device. The drive shaft and auger assembly further includes a disk-shaped thrust washer formed upon the central shaft. The device further includes a removeable end cap fastened upon the second end of the cylindrical tube portion. The removeable end cap includes a central aperture through which the drive shaft shank extends therethrough. The disk-shaped thrust washer is disposed within the cylindrical tube portion and is held within the cylindrical tube portion during operation of the portable grout device by the removeable end cap.

In some embodiments, the device further includes an adaptor disposed upon the first end is operable to redirect the grout.

The above features and advantages and other features and advantages of the present disclosure are readily apparent from the following detailed description of the best modes for carrying out the disclosure when taken in connection with the accompanying drawings.

DETAILED DESCRIPTION

Figure 1:
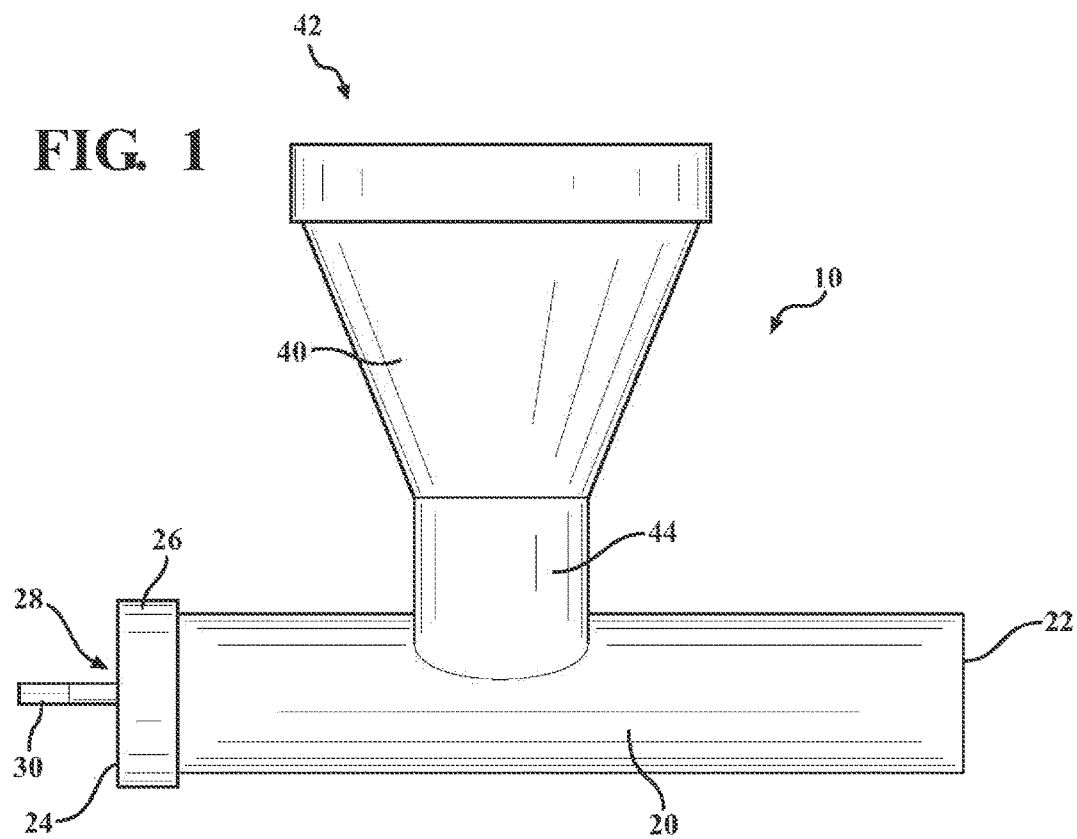
FIG. 1 schematically illustrates in side view a portable grout device useful to provide a flow of grout to a work surface, in accordance with the present disclosure.

FIG. 1 schematically illustrates in side view a portable grout device 10 useful to provide a flow of grout to a work surface. Portable grout device 10 is illustrated including a cylindrical tube portion 20, a drive shaft shank 30, and a grout hopper 40. Cylindrical tube portion 20 includes an internal mechanism useful to pump grout through the cylindrical tube portion 20. The internal mechanism includes a drive shaft shank 30 extending from a first end 24 of the cylindrical tube portion 20. Grout hopper 40 includes an open top 42 and a cylindrical tube interface portion 44. Grout poured into the grout hopper 40 feeds by gravity into the cylindrical tube portion 20, wherein turning of or a torque applied to the drive shaft shank 30 causes the grout to move toward a second end 22 of the cylindrical tube portion 20, where the grout is caused to pour out of the second end 22 on to a work surface.

The cylindrical tube portion 20 may be constructed with plastic, metal, or other similar materials. In one embodiment, the cylindrical tube portion 20 may be constructed with polyvinyl chloride (PVC). The grout hopper may similarly be constructed with plastic. By constructing portions of the portable grout device 10 with lightweight plastics, the overall weight of the device may be kept to a minimum, thereby reducing fatigue in a user holding the device during use. The cylindrical tube portion 20 may include an integrally formed closed end at first end 24, with a small aperture formed for the drive shaft shank 30 to extend therethrough. In the embodiment of FIG. 1, an end cap 26 is illustrated attached to the first end 24. The end cap 26 includes a small aperture 28 formed for the drive shaft shank 30 to extend therethrough. In one embodiment, the end cap 26 may be removeable, such as by attachment to the cylindrical tube portion 20 with helical threads, such that the end cap 26 may be easily removed. Removal of the end cap 26 permits the user to easily clean grout off of internal portions of the device after use so that the device may be reused later.

Figure 2:
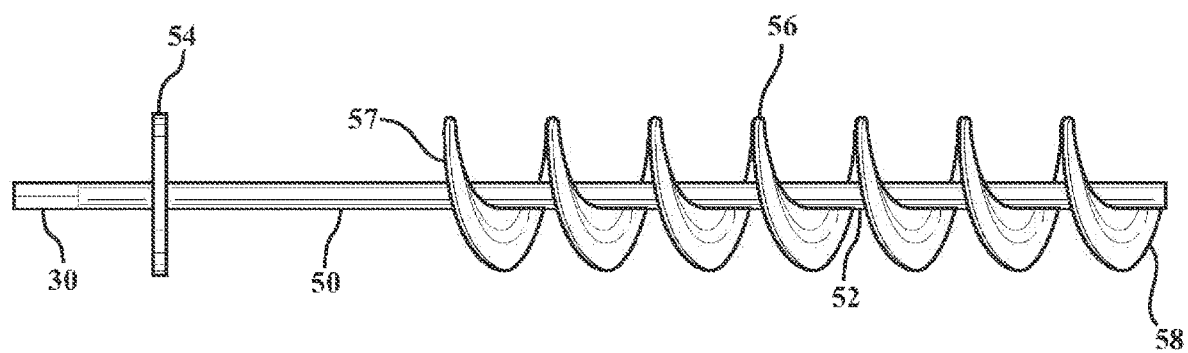
FIG. 2 schematically illustrates a drive shaft and auger assembly of the portable grout device of FIG. 1, in accordance with the present disclosure.

FIG. 2 schematically illustrates a drive shaft and auger assembly 50 of the portable grout device of FIG. 1. As described in relation to FIG. 1, torque applied to the drive shaft shank causes grout to move within the cylindrical tube portion 20 toward the second end 22. According to one embodiment, the internal mechanism of the portable grout device 10 includes a helical auger screw 56. The auger screw 56 includes a flute which forms a spiral helix around a central shaft 52. A first end of the auger screw 56 is located in a central portion of the central shaft 52 and is disposed such that grout falling into the cylindrical tube portion 20 of FIG. 1 from the grout hopper 40 is collected within the auger screw 56. As the auger screw 56 is turned as torque is applied to the central shaft 52 through the drive shaft shank 30, grout within the auger screw 56 moves from left to right upon the illustrated drive shaft and auger assembly 50.

A disk-shaped thrust washer 54 is illustrated formed upon the drive shaft and auger assembly 50. As the auger screw 56 turns and pushes grout to a right of FIG. 1, an equal and opposite force pushes the drive shaft and auger assembly 50 to the left. The disk-shaped thrust washer 54 pushes against the end cap 26 such that the drive shaft and auger assembly 50 is held in place while turning.

In one embodiment, the auger screw 56 may extend from the disk-shaped thrust washer 54 to an end 58. In the embodiment of FIG. 2, the auger screw 56 starts at central point 57.

Figure 3:
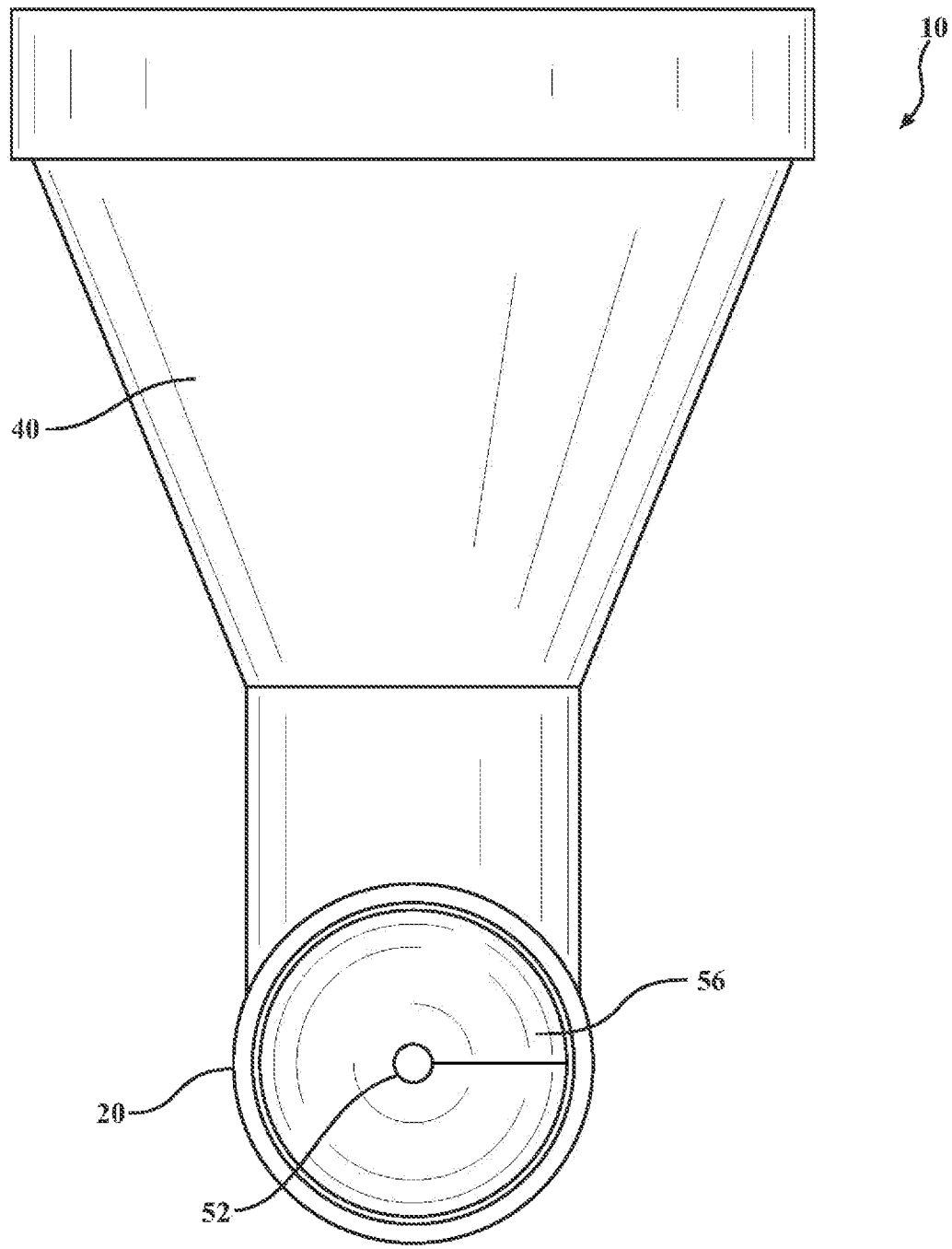
FIG. 3 schematically illustrates in front view the portable grout device of FIG. 1, in accordance with the present disclosure.

FIG. 3 schematically illustrates in front view the portable grout device 10. The portable grout device 10 is illustrated including the cylindrical tube portion 20, the auger screw 56 and the central shaft 52, and the grout hopper 40.

Figure 4:
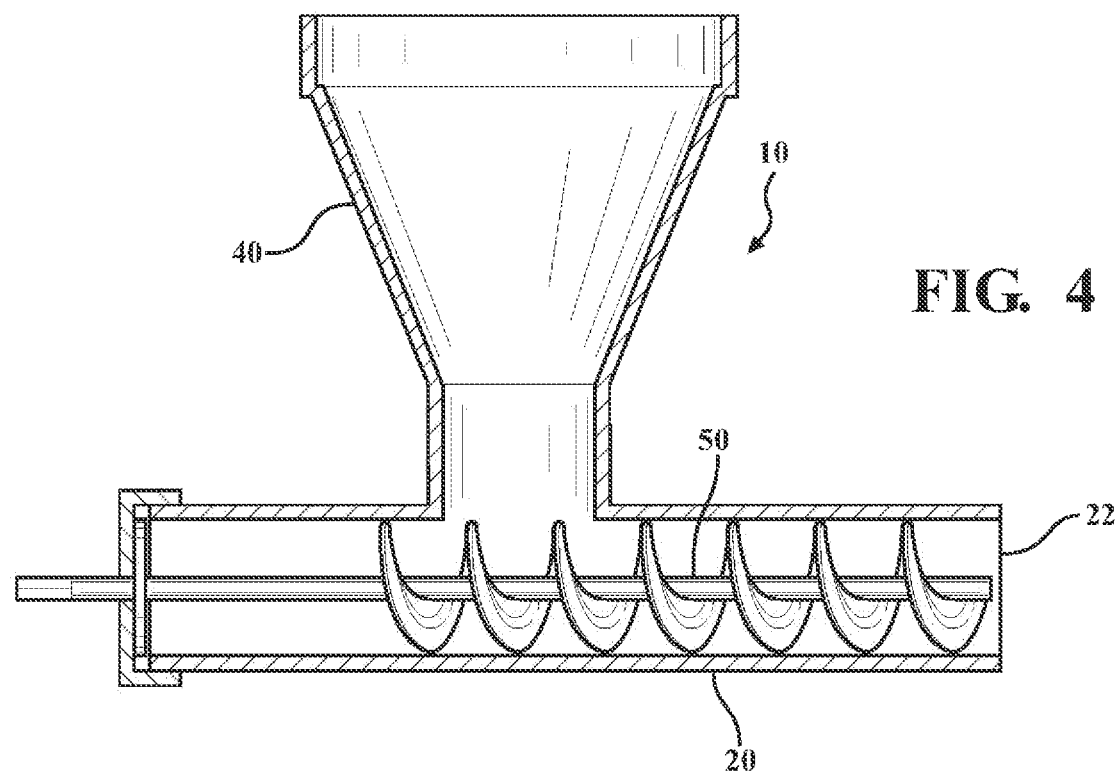
FIG. 4 schematically illustrates in cross sectional view the portable grout device of FIG. 1, in accordance with the present disclosure.

FIG. 4 schematically illustrates in cross sectional view the portable grout device 10. The cylindrical tube portion 20, the grout hopper 40, and the drive shaft and auger assembly 50 are illustrated. As the drive shaft and auger assembly 50 is turned, grout is pushed out of the second end 22 of the cylindrical tube portion 20.

Figure 5:
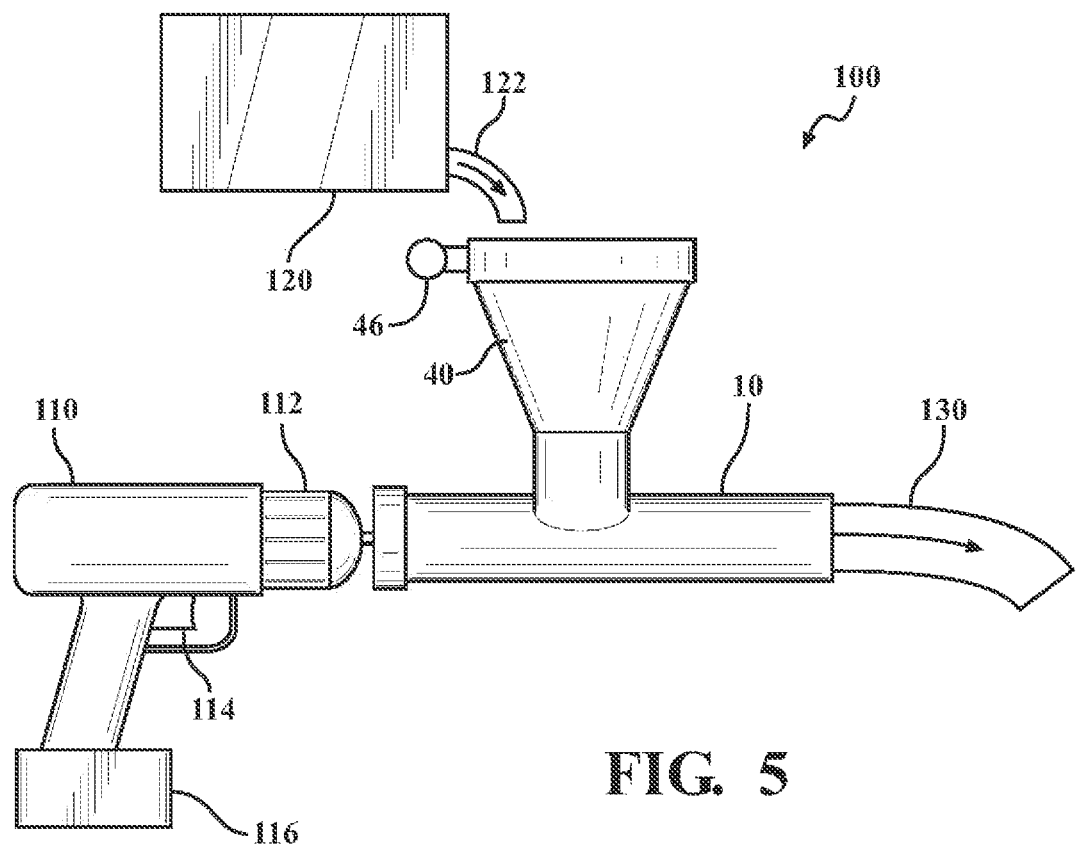
FIG. 5 schematically illustrates in side view a portable grout system including the portable grout device of FIG. 1, in accordance with the present disclosure.

FIG. 5 schematically illustrates in side view a portable grout system 100 including the portable grout device 10. The portable grout device 10 is illustrated including the grout hopper 40. The grout hopper 40 is illustrated with an optional handle 46 which may provide an ergonomic support point for a user to grip the portable grout device 10. A torque generating device 110 embodied as a cordless drill device is illustrated connected to the portable grout device. The torque generating device 110 includes an adjustable bit mechanism 112 operable to enable one to secure the torque generating device 110 to the drive shaft shank 30 of the portable grout device 10. The torque generating device 110 further includes an optional battery pack 116 and a trigger 114 enabling selective operation of the torque generating device 110. In place of the battery pack 116, the torque generating device may include a power cord that may be connected to an alternating current power outlet.

A grout dispensing container 120 is illustrated, with a supply of grout 122 being poured into the grout hopper 40. The supply of grout 122 may include water content useful to create a slurry of grout ready to be applied to a work surface. As the portable grout device is operated, a flow of grout 130 is illustrated flowing from the portable grout device. The flow of grout 130 may be utilized to provide grout upon a work surface.

Figure 6:
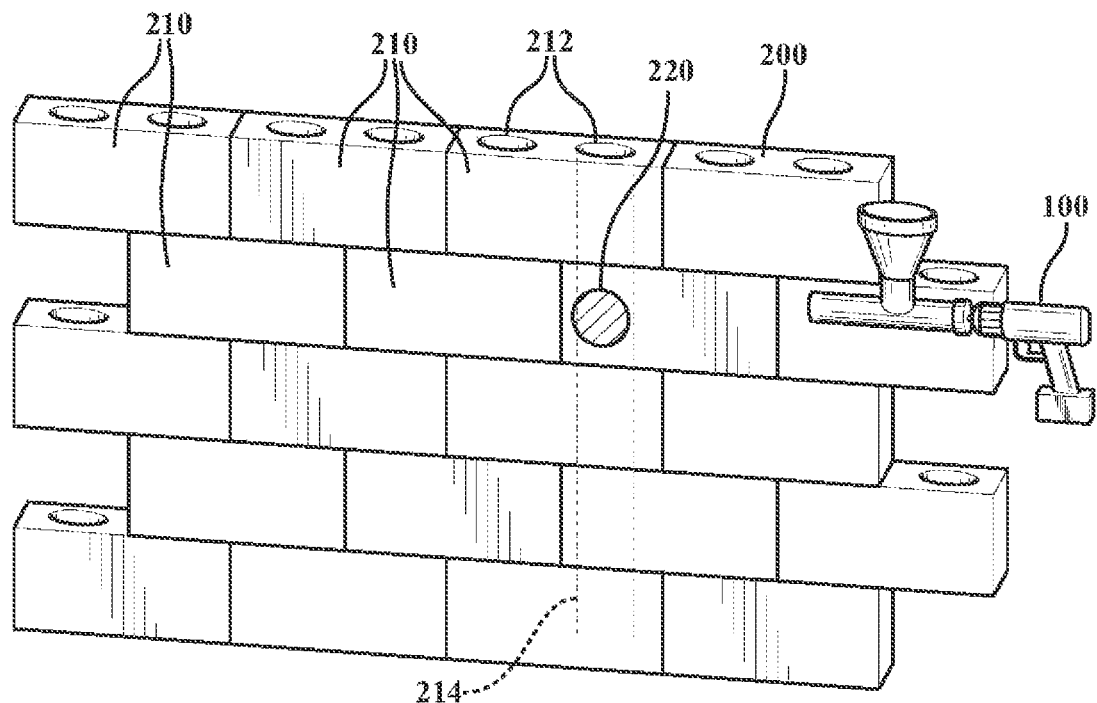
FIG. 6 illustrate the portable grout system of FIG. 5 being used to fill a hole in an exemplary cement block wall, accordance with the present disclosure.

FIG. 6 illustrates the portable grout system 100 being used to fill a hole 220 in an exemplary cement block wall 200. The cement block wall 200 includes a plurality of cement blocks 210. The cement blocks 210 each include two vertical holes 212 which approximately line up in each stacked cement block 210. These stacked vertical holes 212 create internal hollow columns 214 within the cement block wall 200. The hole 220 is located on a front side of the wall providing access to the internal hollow column 214. The portable grout system may be disposed upon or within the hole 220, and the torque generating device of the portable grout system 100 may be activated to provide a flow of grout into the hole 220. In another exemplary use, the portable grout system 100 may be disposed and activated to pour grout down one of the vertical holes 212 at the top of the cement block wall 200.

Figure 7:
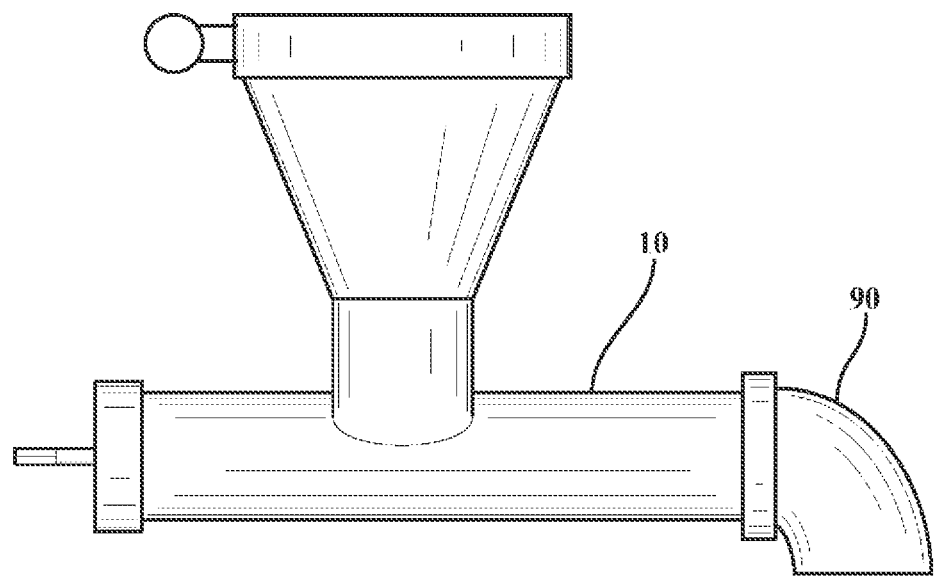
FIG. 7 schematically illustrates the portable grout device of FIG. 5 including an optional adapter affixed to an end of the cylindrical tube portion, in accordance with the present disclosure.

FIG. 7 schematically illustrates in side view the portable grout device 10 of FIG. 5 including an optional adapter 90 upon an end of the device. Adapter 90 is fastened to an end of the cylindrical tube portion of the portable grout device 10 such that grout being pumped by the device will exit the adapter 90 in a downward direction. This direction of the grout may be helpful, for example, in providing grout into the vertical holes 212 at the top of the cement block wall 200 in FIG. 6. The adapter 90 of FIG. 7 is illustrated configured to redirect the grout ninety degrees from the direction of the attached cylindrical tube portion of the portable grout device 10. In other embodiments, the adapter may be configured to redirect the grout in other angles, such as thirty degrees, forty five degrees, and sixty degrees from the attached cylindrical tube portion.

While the best modes for carrying out the disclosure have been described in detail, those familiar with the art to which this disclosure relates will recognize various alternative designs and embodiments for practicing the disclosure within the scope of the appended claims.

What is claimed is:

1. A portable grout device comprising:
   a grout hopper;
   a cylindrical tube portion connected to and operable to receive grout from the grout hopper, wherein the cylindrical tube portion includes:

a constant inner diameter along a length of the cylindrical tube portion; and
a dispensing end with an inner diameter equal to the constant inner diameter and configured for dispensing the grout from the portable grout device; and
a drive shaft and auger assembly within the cylindrical tube portion including:
a central shaft including a first end portion, a second end portion distal from the first end portion, and a central point on the central shaft between the first end portion and the second end portion;
a disk-shaped thrust washer formed upon the first end portion; and
a helical auger screw operable to push the grout out of the dispensing end of the cylindrical tube portion, wherein the helical auger screw extends from the central point to the second end portion and wherein the central shaft includes a helical auger screw-free portion between the central point and the disk-shaped thrust washer; and
wherein the portable grout device is configured for the grout to flow from the dispensing end to be utilized upon a working surface at a diameter equal to the constant inner diameter; and
wherein the portable grout device is configured to be handheld.

2. The portable grout device of claim 1, wherein the dispensing end of the cylindrical tube portion includes a second end of the cylindrical tube portion; and
wherein the drive shaft and auger assembly further includes a drive shaft shank formed upon the first end portion and extending from a first end of the cylindrical tube portion, wherein the drive shaft shank is operable to be driven by a handheld torque generating device.

3. The portable grout device of claim 2, further comprising a removeable end cap fastened upon the first end of the cylindrical tube portion, wherein the removeable end cap includes a central aperture through which the drive shaft shank extends therethrough; and
wherein the disk-shaped thrust washer is disposed within the cylindrical tube portion and is held within the cylindrical tube portion during operation of the portable grout device by the removeable end cap.

4. The portable grout device of claim 1, wherein the grout hopper includes a handle.

5. A portable grout system, comprising:
a portable grout device including:
a grout hopper;
a cylindrical tube portion connected to and operable to receive grout from the grout hopper, wherein the cylindrical tube portion includes:
a constant inner diameter along a length of the cylindrical tube portion; and
a dispensing end with an inner diameter equal to the constant inner diameter and configured for dispensing the grout from the portable grout device;
a drive shaft and auger assembly within the cylindrical tube portion including:
a central shaft including a first end portion, a second end portion distal from the first end portion, and a central point on the central shaft between the first end portion and the second end portion;
a disk-shaped thrust washer formed upon the first end portion; and
a helical auger screw operable to push the grout out of the dispensing end of the cylindrical tube portion, wherein the helical auger screw extends from the central point to the second end portion and wherein the central shaft includes a helical auger screw-free portion between the central point and the disk-shaped thrust washer; and
a portable torque generating device connected to the drive shaft and auger assembly; and
wherein the portable grout device is configured for the grout to flow from the dispensing end to be utilized upon a working surface at a diameter equal to the constant inner diameter; and
wherein the portable grout device is configured to be handheld.

6. The portable grout system of claim 5, wherein the portable torque generating device includes a cordless drill device.

7. The portable grout system of claim 5, wherein the dispensing end of the cylindrical tube portion includes a second end of the cylindrical tube portion; and
wherein the drive shaft and auger assembly includes a drive shaft shank formed upon the first end portion and extending from a first end of the cylindrical tube portion, wherein the drive shaft shank is operable to be driven by the portable torque generating device.

8. The portable grout system of claim 7, further comprising a removeable end cap fastened upon the first end of the cylindrical tube portion, wherein the removeable end cap includes a central aperture through which the drive shaft shank extends therethrough; and
wherein the disk-shaped thrust washer is disposed within the cylindrical tube portion and is held within the cylindrical tube portion during operation of the portable grout device by the removeable end cap.

9. The portable grout system of claim 5, wherein the grout hopper includes a handle.

10. A portable grout device comprising:
a grout hopper including a handle portion;
a cylindrical tube portion connected to and operable to receive grout from the grout hopper, wherein the cylindrical tube portion includes:
a constant inner diameter along a length of the cylindrical tube portion;
a second end, wherein the second end is a dispensing end with an inner diameter equal to the constant inner diameter and configured for dispensing the grout from the portable grout device; and
a first end;
a drive shaft and auger assembly within the cylindrical tube portion including:
a central shaft including a first end portion, a second end portion distal from the first end portion, and a central point on the central shaft between the first end portion and the second end portion;
a disk-shaped thrust washer formed upon the first end portion;
a helical auger screw operable to push the grout out of the second end of the cylindrical tube portion, wherein the helical auger screw extends from the central point to the second end portion and wherein the central shaft includes a helical auger screw-free portion between the central point and the disk-shaped thrust washer; and
a drive shaft shank formed upon the first end portion and extending from the first end of the cylindrical tube portion, wherein the drive shaft shank is operable to be driven by a handheld torque generating device; and a removeable end cap fastened upon the first end of the cylindrical tube portion, wherein the removeable end cap includes a central aperture through which the drive shaft shank extends therethrough; and wherein the disk-shaped thrust washer is disposed within the cylindrical tube portion and is held within the cylindrical tube portion during operation of the portable grout device by the removeable end cap;

wherein the portable grout device is configured for the grout to flow from the dispensing end to be utilized upon a working surface at a diameter equal to the constant inner diameter; and p1 wherein the portable grout device is configured to be handheld.

\* \* \* \* \*